United States Patent
Fujikawa

(10) Patent No.: US 7,341,178 B2
(45) Date of Patent: Mar. 11, 2008

(54) PROCESSING APPARATUS, SYSTEM AND METHOD FOR PROCESSING CHECKS IN COMMUNICATION WITH A HOST COMPUTER AND A HOST COMPUTER FOR CONTROLLING THE CHECK PROCESSING APPARATUS

(75) Inventor: Masashi Fujikawa, Hara-mura (JP)

(73) Assignee: Seiko Epson Corporation (JP)

( * ) Notice: Subject to any disclaimer, the term of this patent is extended or adjusted under 35 U.S.C. 154(b) by 484 days.

(21) Appl. No.: 10/990,175

(22) Filed: Nov. 15, 2004

(65) Prior Publication Data

US 2005/0127160 A1 Jun. 16, 2005

(30) Foreign Application Priority Data

Nov. 13, 2003 (JP) ............................. 2003-384060

(51) Int. Cl.
G07F 19/00 (2006.01)
(52) U.S. Cl. .................. 235/379; 235/383; 705/43; 705/44; 705/45
(58) Field of Classification Search ............... 235/379, 235/383; 700/223; 705/16, 17, 21, 24, 43–45
See application file for complete search history.

(56) References Cited

U.S. PATENT DOCUMENTS 5,926,392 A * 7/1999 York et al. ................. 700/223
6,012,633 A * 1/2000 Ochiai et al. .............. 235/379
6,145,737 A 11/2000 Imai et al.
6,257,783 B1 7/2001 Hanaoka et al.
2002/0195492 A1 12/2002 Murata et al.
2003/0047609 A1 3/2003 Endo et al.

FOREIGN PATENT DOCUMENTS

JP 2000-344428 12/2000
JP 2003-006551 A 1/2003

OTHER PUBLICATIONS 48-page English specification plus 15 sheets of drawings (Figs. 1-15) for U.S. Appl. No. 10/759,868, filed Jan. 15, 2004 in the name of Fujikawa.

* cited by examiner

Primary Examiner—Michael G. Lee
Assistant Examiner—Kristy A. Haupt
(74) Attorney, Agent, or Firm—Anderson Kill & Olick, PC

(57) ABSTRACT

Processing apparatus, system and method for processing checks in communication with a host computer for accurately detecting check multifeeding. The check processing system includes a check processing apparatus and a host computer in communication with the check processing apparatus. The check processing apparatus acquires and sends check information from a check S to the host computer, and then pauses check processing. Based on the received check information, the host computer confirms whether checks are multifeeding in the check processing apparatus.

5 Claims, 13 Drawing Sheets

US 7,341,178 B2

PROCESSING APPARATUS, SYSTEM AND METHOD FOR PROCESSING CHECKS IN COMMUNICATION WITH A HOST COMPUTER AND A HOST COMPUTER FOR CONTROLLING THE CHECK PROCESSING APPARATUS

BACKGROUND OF THE INVENTION

1. Field of Technology

The present invention relates to a processing apparatus, system and method for processing checks in communication with a host computer.

2. Description of Related Art

Payment systems using checks are widely used throughout Europe and North America (world wide). This payment system enables businesses and consumers to use checks to make payments and financial transfers of many kinds. When a check is written, it is ultimately presented to the bank on which the check was drawn to either deposit or withdraw funds.

Bank tellers at each bank branch typically process many checks in a short time. The bank teller also typically confirms check validity, the check date, and the signature before completing the deposit or withdrawal. The teller also prints an endorsement on the back, and issues a transaction receipt as required. The teller may also require a driver license or other photo ID to check the identity of the person presenting the check, and in some situations may make a photocopy of the license or photo ID using a copying machine. A copy of the check is also captured and stored using a specialized check Scanner.

To process checks more efficiently by electromagnetically reading and processing information from each check, compact check processing terminals that can be installed at each teller window have been developed so that each teller can process checks more quickly with dependable accuracy.

These check processing terminals have a magnetic ink character reader (MICR), scanner, and printing mechanism disposed along the check transportation path. When a check is received from a customer, the teller passes the check through the check processing terminal. The check processing terminal thus reads the magnetic ink characters printed on the check, captures an image of the check, and may print an endorsement on the back. See, for example, Japanese Unexamined Patent Appl. Pub. 2000-344428.

In Japanese patent application 2003-066747 (U.S. patent application Ser. No. 10/759,868), a check processing apparatus is described which can image both checks and cards such as a driver license. The check transportation path and the card transportation path in this check processing apparatus share part of the same media transportation path. A contact image sensor (CIS) scanner is disposed to this common portion of the transportation path so that a single scanner can be used to scan and image different types of media, that is, both checks and cards.

A common problem of check processing terminals with this type of medium transportation path is that two or more checks may unintentionally be conveyed simultaneously along the transportation path. This is called "multifeed," and the problem is inherent. One approach to solving this problem is to provide a detector that detects multifeeding by directly or indirectly detecting the thickness of the medium being transported through the check processing apparatus.

Because multifeed detection by this multifeed detection device is not completely dependable, when the multifeed detection device does not detect multifeeding because of some operational error, the check processing apparatus might process only the front of the check and not process the back of the check. If this occurs a record of the unprocessed back of the check is not stored in the check processing apparatus. Nevertheless the check is discharged as though the front and back was processed properly and bundled with other correctly processed checks. This unprocessed check must be later retrieved from the bundle of processed checks and passed again through the check processing apparatus to complete the processing of the check. This is a time-consuming nuisance.

Moreover, when the check processing apparatus also prints an endorsement or other information recording the transaction on the back of processed checks, and two checks are processed together without multifeeding of the checks being detected, it is possible that the transaction record for the front check will be printed on the back of the back check. In this case the transaction record is not printed on the correct check.

The present invention is directed to a processing apparatus, system and method for processing checks in communication with a host computer for solving the above problems.

SUMMARY OF THE INVENTION

To achieve the foregoing objectives, the processing apparatus according to the present invention is connected to communicate with a host computer to analyze check information to determine if multifeeding has occurred. The processing apparatus comprises a paper supply unit for feeding checks individually to a paper transportation path; an information reading sensor for acquiring check information relating to the check; a transmission unit for sending the check information to the host computer; a communication control unit for receiving a print command from the host computer after sending the check information; and a printing unit for printing to the check according to the print command. The information reading sensor has an image scanning sensor disposed to the paper transportation path for acquiring check image information as the check information; an MICR disposed to the paper transportation path for acquiring magnetic ink character information from magnetic ink characters printed on the check as the check information; and a multifeed detection device for detecting thickness information for the check conveyed on the paper transportation path. The communication control unit receives the print command when multifeeding is not detected based either on the thickness information, image information acquired by the image scanning sensor, and magnetic ink character information acquired by the MICR.

The check processing apparatus is controlled by a host computer which is connected to communicate with the check processing apparatus, and has a transmission unit for sending an acquisition command to the check processing apparatus to acquire check information relating to a check; a reception unit for receiving the check information from the check processing apparatus; and a control unit for confirming presence or absence of check multifeeding in the check processing apparatus based on the check information. The host computer commands the check processing apparatus to print a transaction record to the check based on an analysis of the check information for detecting multifeeding. The check information includes thickness information for the check conveyed on the paper transportation path, image information for the check, and magnetic ink character information acquired from magnetic ink characters printed on the check. The control unit determines the presence of multifeeding based on evaluating the thickness information, the image information, and the magnetic ink character information, and sends the print command when check multifeeding is not detected.

Preferably, the host computer includes a display device for displaying the thickness information, image information, and magnetic ink character information received from the check processing apparatus; and an input device enabling entering whether the thickness information, image information, and magnetic ink character information displayed on the display device is correct or not.

The image information preferably includes check front image information and check back image information, and the control unit includes software for comparing the front and back check images to detect multifeeding.

The control unit preferably also detects multifeeding by confirming if the magnetic ink character information was read correctly.

A further aspect of the invention is a system for processing checks comprising a check processing apparatus and a host computer connected to communicate with the check processing apparatus. The check processing apparatus in the system comprises a paper supply unit for feeding checks individually to a paper transportation path; an information reading sensor for acquiring check information from the check(s) disposed to said paper transportation path; a transmission unit for sending the check information acquired from the information reading sensor to the host computer; a communication control unit for receiving a print command from the host computer after sending the check information; and a printing unit for printing to the check according to the print command. The host computer in the system comprises a transmission unit for sending a check information acquisition command to the check processing apparatus; a reception unit for receiving the check information from the check processing apparatus; and a control unit for confirming the presence or absence of check multifeeding in the check processing apparatus based on the check information acquired from the information reading sensor with the control unit generating an error message when multifeeding is detected and sending a print command to the check processing apparatus when multifeeding is not detected. The information reading sensor in the system comprises an image scanning sensor disposed to the paper transportation path for acquiring check image information as the check information; an MICR disposed to the paper transportation path for acquiring magnetic ink character information from magnetic ink characters printed on the check as the check information; and a multifeed detection device for detecting thickness information from the check(s) conveyed on the paper transportation path past said MICR.

The host computer preferably also includes a display device for displaying the thickness information, image information, and magnetic ink character information received from the check processing apparatus; and an input device enabling entering whether the thickness information, image information, and magnetic ink character information displayed on the display device is correct or not.

A further aspect of the invention is a method of check processing in a check processing system including a check processing apparatus having an information reading sensor and printer and a host computer connected to communicate with the check processing apparatus. The method comprises the steps of: feeding checks individually along a paper transportation path; using said information reading sensor to acquire check information from the check(s) disposed to said paper transportation path with said check information including image information for the check, magnetic ink character information acquired from magnetic ink characters printed on the check, and thickness information for the check; sending the check information to the host computer; commanding the check processing apparatus to print a transaction record to the check based on the check information; displaying the image information, magnetic ink character information, and thickness information as received by the host computer; receiving confirmation of the image information, magnetic ink character information, and thickness information displayed on the display device; determining if more than one check is being multifed to said information reading sensor, and: commanding the check processing apparatus to print a transaction record on the check based on said determination.

The host computer in conjunction with the check processing apparatus prevents printing to a check until the host computer confirms that check multifeeding has not been detected. More specifically, the check processing apparatus only prints to a check, and more specifically only prints an endorsement or transaction record to a check, after confirming that checks are not multifeeding.

BRIEF DESCRIPTION OF THE DRAWINGS

Other objects and attainments together with a fuller understanding of the invention will become apparent and appreciated by referring to the following description and claims taken in conjunction with the accompanying drawings of which:

DESCRIPTION OF THE PREFERRED EMBODIMENTS

Preferred embodiments of a check processing apparatus, system and method according to the present invention are described below with reference to the accompanying figures.

Figure 1:
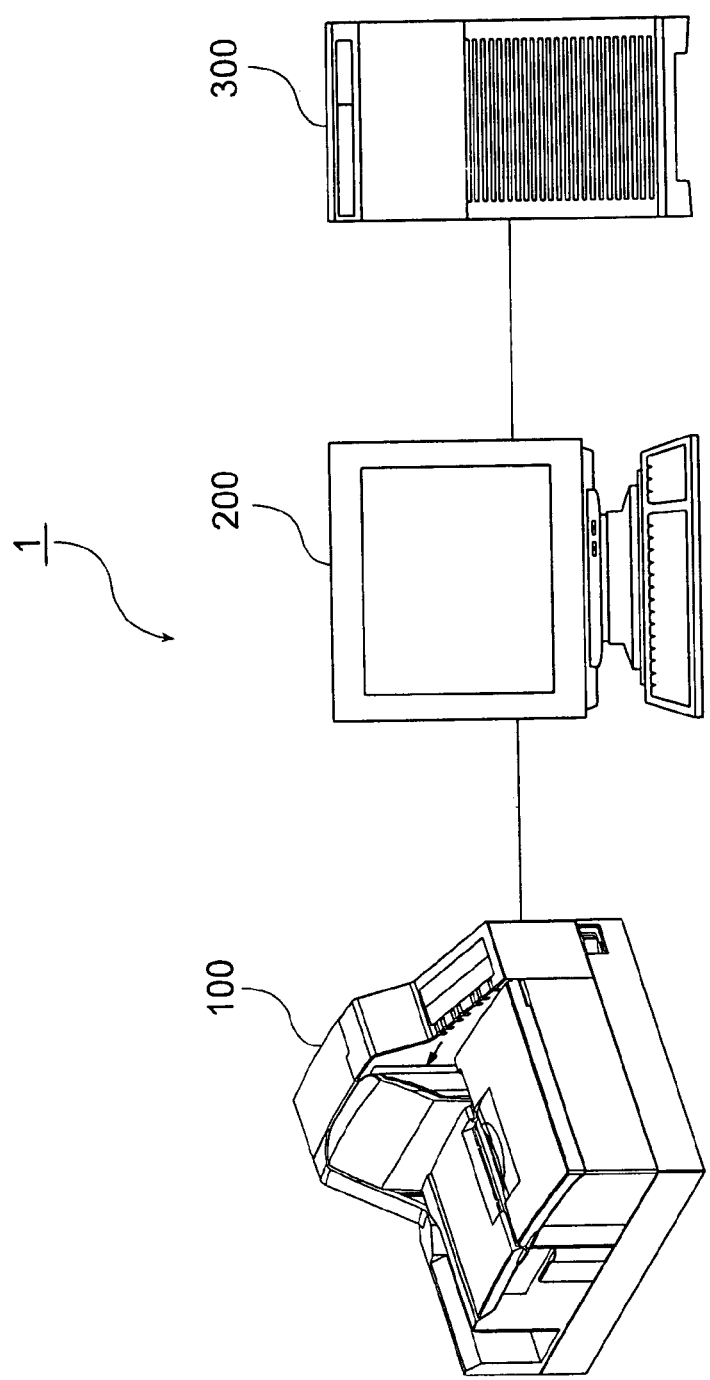
FIG. 1 shows a check processing system according to the present invention.

FIG. 1 illustrates the system 1 of the present the invention for processing checks.

The system 1 includes a check processing apparatus 100, a host computer for the check processing apparatus 200 which is connected to enable communication with the check processing apparatus 100, and a server 300 connected to enable communication with the host computer 200.

Check processing in this embodiment of the invention involves using the check processing apparatus 100 to acquire magnetic ink character information, image information including front and back images of the check, and paper thickness information from the check, and to then send this acquired information to the host computer 200. The host computer 200 then confirms with or without user or operator assistance if the checks are multifeeding or not based on the received MICR information, front and back image information, and paper thickness information, and then sends a print command to the check processing apparatus 100 to check prints to the check S.

The check processing apparatus 100 of the present invention is described first below.

Figure 2:
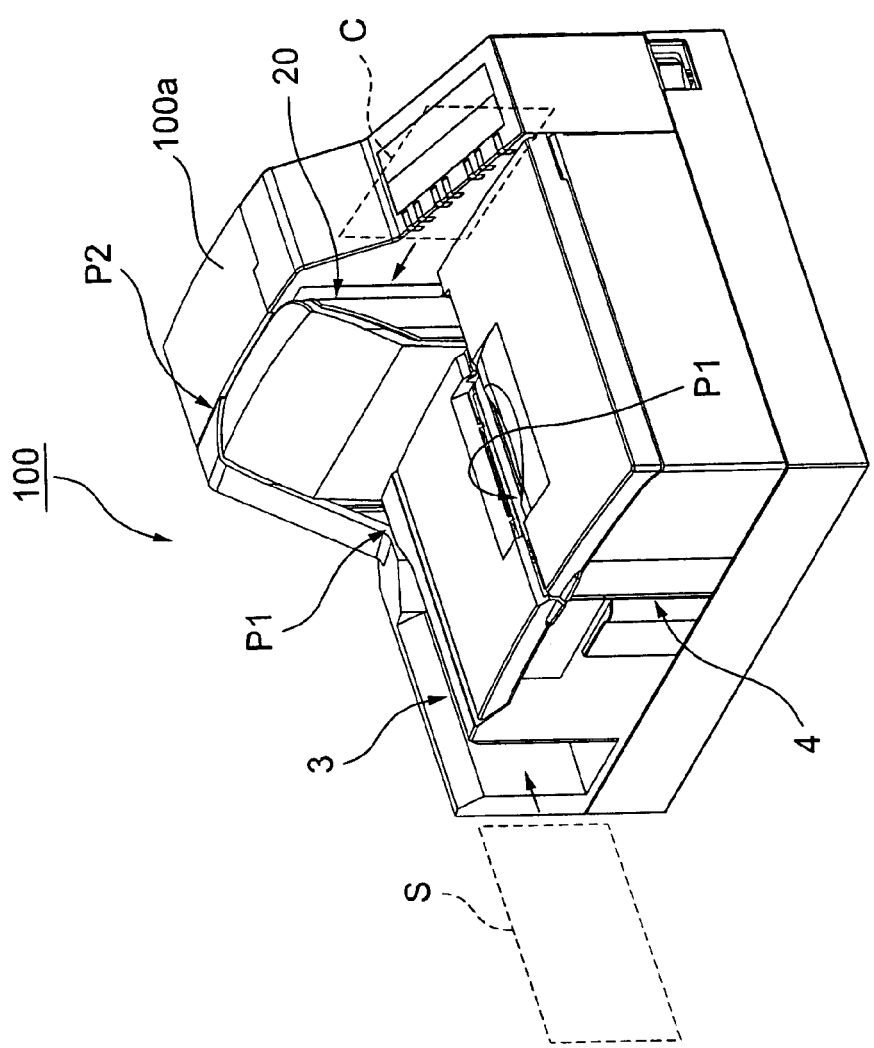
FIG. 2 is an oblique view of a check processing apparatus as is used in the system of FIG. 1.

As shown in FIG. 2, the check processing apparatus 100 according to this embodiment of the invention can transport checks S through a first transportation path P1 formed in the case 100a, and can transport cards C through a second transportation path P2 likewise formed in the case 100a. The checks S are also referred to herein as a first scanning medium and are loaded into a paper supply section 3. The cards C are inserted from a card insertion slot 20, and are also referred to herein as a second scanning medium.

More specifically, the check processing apparatus 100 can image each check S, read the magnetic ink characters printed on the check S, and print on the check S as needed while conveying the check S through the first transportation path P1, and can image a card C while conveying the card C through the second transportation path P2. The check processing apparatus 100 includes an image scanner for scanning checks S and cards C, an MICR reader for reading checks S, and a printer for printing on checks S.

Figure 4:
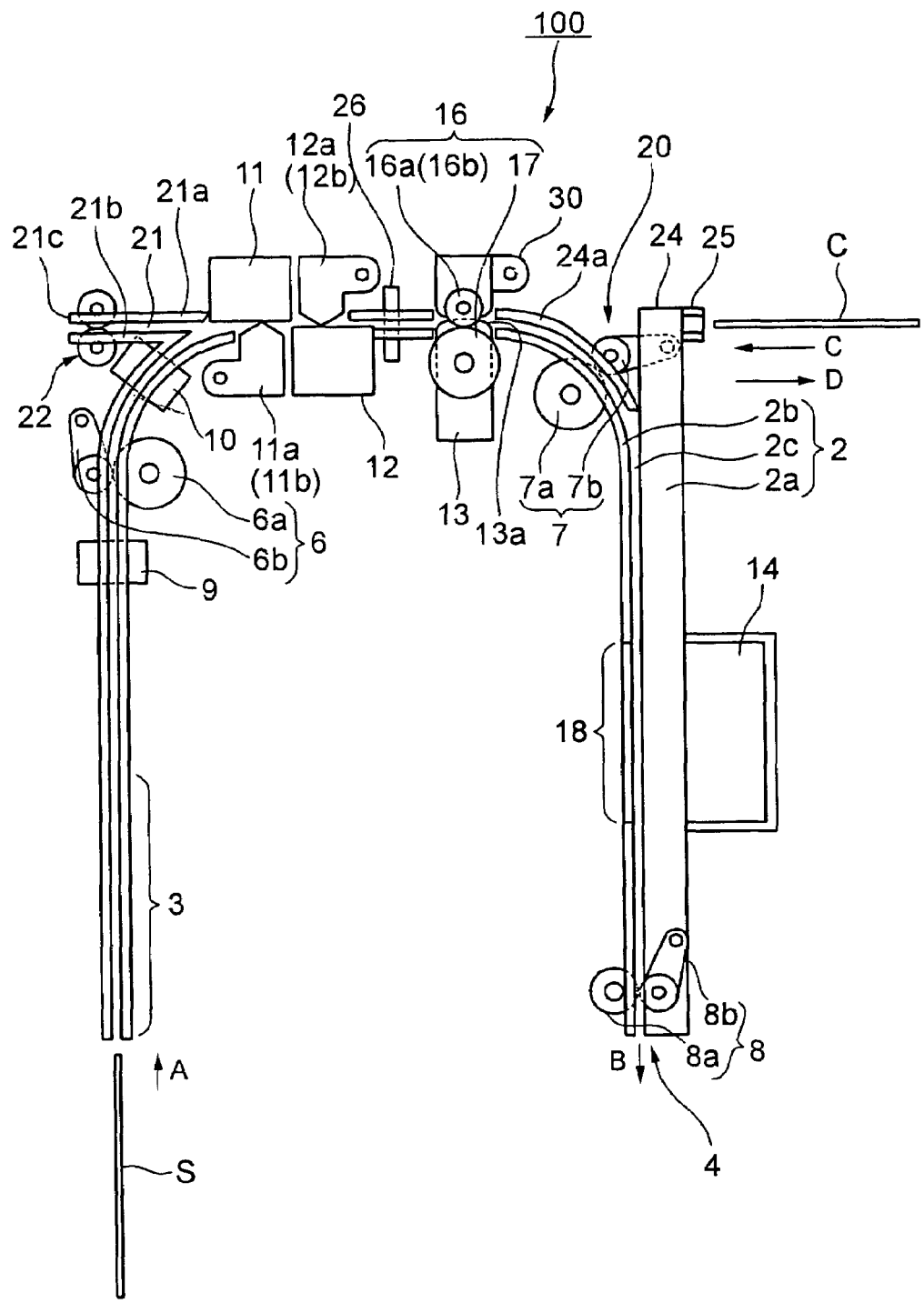
FIG. 4 is a schematic top view of the internal configuration of the check processing apparatus of FIG. 2.

Referring to FIG. 2, checks S travel from the paper supply section 3 through path P1, path P2 (M), path P1, and are discharged from the paper exit 4. When a check S is supplied from the paper supply section 3 and travels through the first leg of the first transportation path P1 and a shared portion of the second transportation path P2, both sides of the check S are imaged by an image scanner, MICR code is read with an MICR head, and multifeeding is detected by an optical multifeed detection device before the check S is conveyed into the second leg of the first transportation path P1 leading to the paper exit 4. When the check S reaches the printing area 18 (see FIG. 4), check transportation stops and MICR reading is verified. If the MICR information is verified, an endorsement (transaction record) is printed to the back side of the check (that is, the side on which the MICR code is not printed) by the print head 14 (FIG. 4). The check S is then discharged from the paper exit 4.

Figure 3:
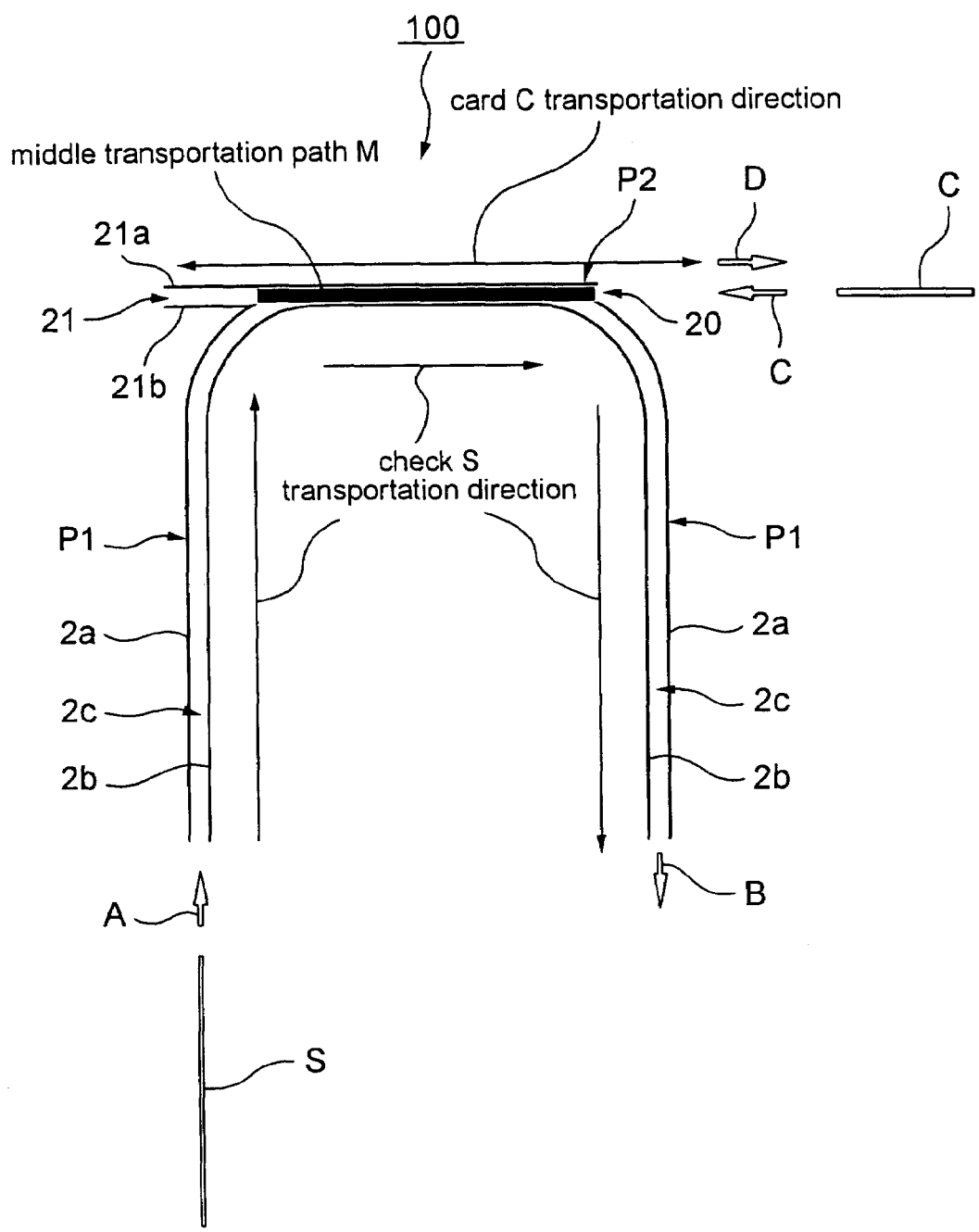
FIG. 3 is a schematic diagram of the paper transportation path in the check processing apparatus of FIG. 2.

As shown in FIG. 3, the first transportation path P1 is basically U-shaped while the second transportation path P2 is straight for conveying cards C. The portion at the middle of the U-shaped path (shaded in FIG. 3) is shared by the first transportation path P1 and second transportation path P2, and this shared portion is referred to below as the middle transportation path M. Different reading devices are disposed to the check processing apparatus 100 along this middle transportation path M. These reading devices are described in further detail below.

As shown in FIG. 3, the first transportation path P1 is formed by an outside guide 2a and an inside guide 2b so that a check S is conveyed through the space, referred to as the transportation portion 2c below, between the outside guide 2a and inside guide 2b. A check S is inserted through the paper supply section 3 in the direction of arrow A in FIG. 3 to the first transportation path P1. Multiple checks S can be stocked in the paper supply section 3, which then supplies the checks individually into the first transportation path P1.

A first transportation roller pair 6 on the upstream side of the middle transportation path M, a middle transportation roller set 16 on the middle transportation path M, and a second transportation roller pair 7 on the downstream side of the middle transportation path M, are disposed to the first transportation path P1 as the transportation mechanism for conveying checks S.

The first transportation roller pair 6 includes a drive roller 6a, and a pressure roller 6b disposed opposite the drive roller 6a with the first transportation path P1 therebetween.

The second transportation roller pair 7 likewise includes a drive roller 7a, and a pressure roller 7b disposed opposite the drive roller 7a with the first transportation path P1 therebetween.

As shown in FIG. 4 the middle transportation roller set 16 includes a lower pressure roller 16b disposed to the lower part of the first transportation path P1, an upper pressure roller 16a disposed above the lower pressure roller 16b, and a drive roller 17 disposed opposite the upper pressure roller 16a and lower pressure roller 16b with the middle transportation path M therebetween.

Figure 5:
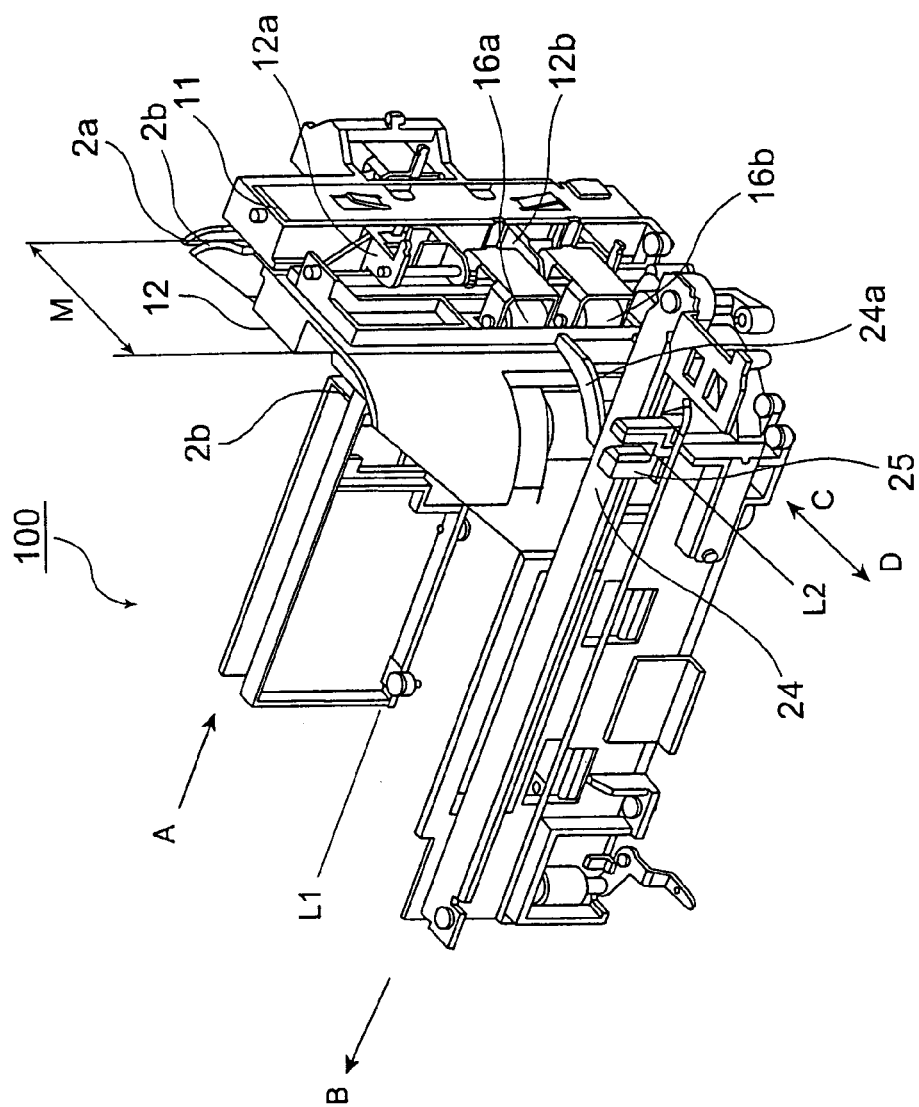
FIG. 5 is an oblique view of the check processing apparatus of FIG. 2 with the outside case removed.
Figure 6:
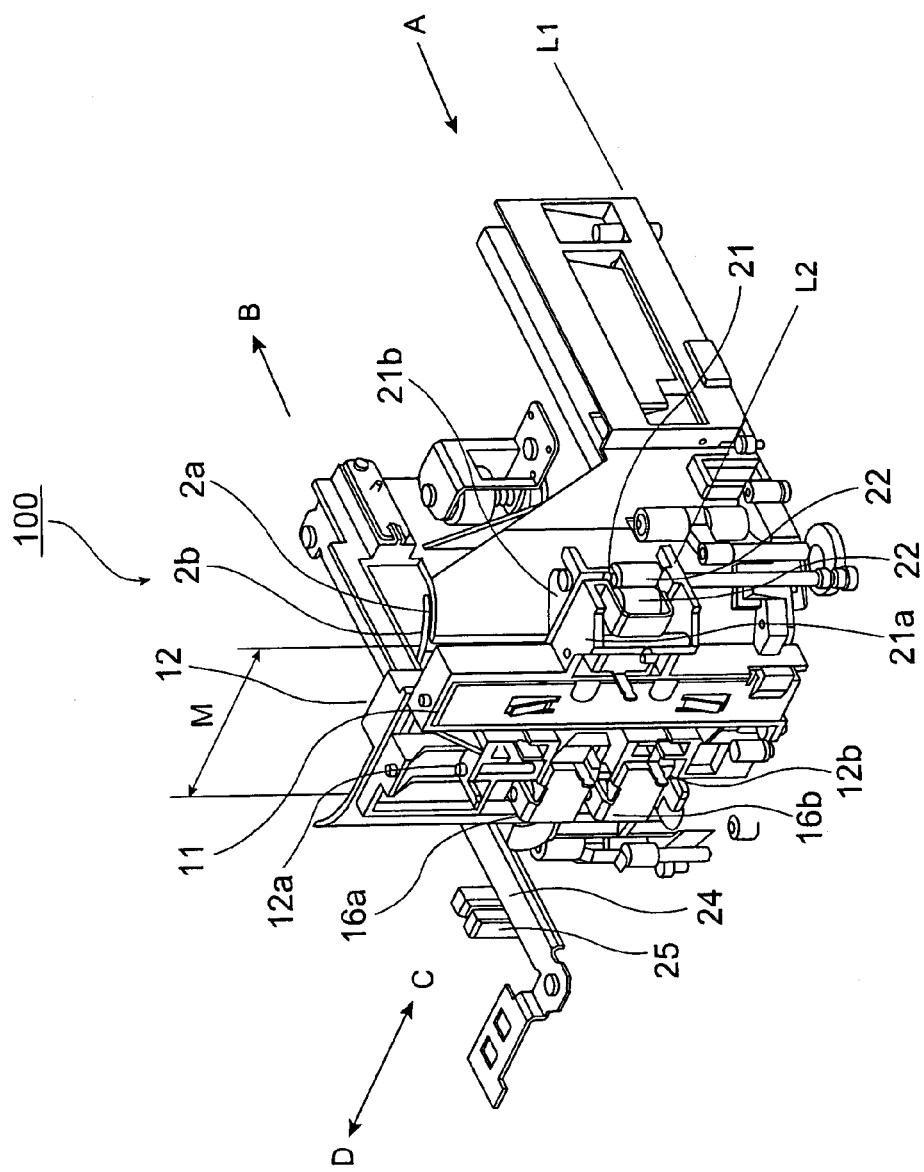
FIG. 6 is another oblique view of the check processing apparatus of FIG. 2 with the outside case removed.

A check S delivered into the first transportation path P1 is conveyed through the middle transportation path M by the first transportation roller pair 6, middle transportation roller set 16, and second transportation roller pair 7 as shown in FIG. 4, and is then discharged from the paper exit 4 in the direction of arrow B by the discharge rollers 8. As shown in FIG. 5, the bottom of the first transportation path P1 is held at height L1, and checks S are conveyed referenced to this height L1 along the bottom of the first transportation path P1, including through the middle transportation path M.

If the width (height) of the check S is less than a predefined dimension, the check S is conveyed by the lower pressure roller 16b and drive roller 17 of the middle transportation roller set 16. If the check S width is equal to or greater than this predefined height, the check S is conveyed by the drive roller 17 and both upper pressure roller 16a and lower pressure roller 16b.

As shown in FIG. 3 and FIG. 4, the second transportation path P2 includes the middle transportation path M and the card insertion slot 20 and card reversing path 21 that are contiguous to opposite ends of the middle transportation path M.

The card insertion slot 20 is an opening for inserting a card C to the middle transportation path M. As shown in FIG. 4 and FIG. 5, bottom guides 24 and 24a are disposed below the card insertion slot 20. These bottom guides 24 and 24a are part of the outside guide 2a, and hold the bottom edge of the card C at a specific height L2. The card C is guided by bottom guide 24 and inserted to the middle transportation path M, and then transported at this height L2. More specifically, the bottom of the second transportation path P2 is held at height L2 referenced to bottom guides 24 and 24a. Note that a check S conveyed through the first transportation path P1 at height L1 is guided by this bottom guide 24a so that the direction of check S travel bends and the check S is conveyed toward the paper exit 4.

The upper pressure roller 16a is disposed to the second transportation path P2 at a position above height L2. A card C conveyed into the middle transportation path M is transported through the middle transportation path M by the upper pressure roller 16a and drive roller 17.

The card reversing path 21 is formed by straight guides 21a, 21b rendered as straight extensions of the middle transportation path M to the left side as seen in FIG. 3. Forward/reverse transportation rollers 22 are disposed near the end portion 21c of this card reversing path 21. The forward/reverse transportation rollers 22 convey a card C transported from the middle transportation path M so that the card C overhangs a specific length from the end portion 21c of the card reversing path 21, and then deliver the card C overhanging from the end portion 21c back into the middle transportation path M.

More specifically, when a card C is inserted from the card insertion slot 20 to the middle transportation path M, the card C is conveyed by the upper pressure roller 16a and drive roller 17 to the card reversing path 21. The card C is then reversed by the forward/reverse transportation rollers 22 and conveyed from the card reversing path 21 through the middle transportation path M until the card C is discharged from the card insertion slot 20. The card C is conveyed through the second transportation path P2 with the bottom edge of the card C held at height L2. Note that in this embodiment of the invention height L2 of the second transportation path P2 is located at a position higher than height L1 of the first transportation path P1. Cards C thus travel through the middle transportation path M at a height above the checks S.

By conveying checks S and cards C at different elevations, this embodiment of the invention can transport different types of media through a U-shaped first transportation path and a straight second transportation path without requiring special switching means to change the transportation path. This embodiment of the invention thus transports checks S and cards C as described above.

A first image scanning sensor 11 and a second image scanning sensor 12 for imaging media are disposed to the middle transportation path M. The first image scanning sensor 11 and second image scanning sensor 12 are contact image sensor (CIS) type image scanners, and thus illuminate the surface of a check S or card C travelling through the middle transportation path M and detect light reflected from the check S or card C. The first image scanning sensor 11 and second image scanning sensor 12 image the check S or card C travelling through the middle transportation path M one scan line at a time to acquire a two-dimensional image of the check S or card C.

A BOF (bottom of form) detector 9 and TOF (top of form) detector 10 for detecting the respective ends of a check S are disposed to the first transportation path P1. The BOF detector 9 is located between the paper supply section 3 and first transportation roller pair 6, detects a check S inserted from the paper supply section 3, and detects the trailing edge (bottom of form) of the check S by detecting when the check S passes the BOF detector 9.

The TOF detector 10 is disposed between the first transportation roller pair 6 and first image scanning sensor 11 to detect the leading edge (top of form) of the check S.

The length of the check S can thus be accurately measured as a result of the BOF detector 9 and TOF detector 10 detecting the leading and trailing edges of the check S.

The check processing apparatus 100 operates to image a check S using the BOF detector 9 and the TOF detector 10. More specifically, starting and stopping the image scanning sensors 11, 12 imaging a check S is controlled based on output from the BOF detector 9 and TOF detector 10. It should be noted that either one of the image scanning sensors 11, 12 could be used to detect the leading edge of the check S, in which case the TOF detector 10 is unnecessary and can be omitted.

A print head 14 is also disposed to the printing area 18 in a straight portion of the first transportation path P1 between the second transportation roller pair 7 and discharge rollers 8. This print head 14 is for printing an endorsement on the check S, and prints to the check S as required.

A BOC (bottom of card) detector 25 and a TOC (top of card) detector 26 are also disposed to the second transportation path P2. The BOC detector 25 is disposed near the card insertion slot 20, detects when a card C is inserted from the card insertion slot 20, and detects when the card C has passed the BOC detector 25 to detect the trailing edge of the card C.

The TOC detector 26 is disposed between the middle transportation roller set 16 and second image scanning sensor 12, and detects the leading edge of the card C.

The length of the card C can thus be accurately measured as a result of the BOC detector 25 and TOC detector 26 detecting the leading and trailing edges of the card C.

The check processing apparatus 100 may also image a card C using the BOC detector 25 and the TOC detector 26. More specifically, starting and stopping scanning a card C by means of image scanning sensor 11 or 12 is controlled based on output from the BOC detector 25 and TOC detector 26. It should be noted that either one of the image scanning sensors 11, 12 could be used to detect the leading edge of the card C, in which case the BOC detector 25 or TOC detector 26 is unnecessary and can be omitted.

An MICR (magnetic ink character reader) 13 is disposed below the drive roller 17. This MICR 13 is a sensor for reading magnetic ink character information recorded in magnetic ink on a check S. A pressure lever 30 disposed opposite the MICR 13 with the middle transportation path M therebetween presses the check S against the surface of the MICR 13 for reading.

Figure 7:
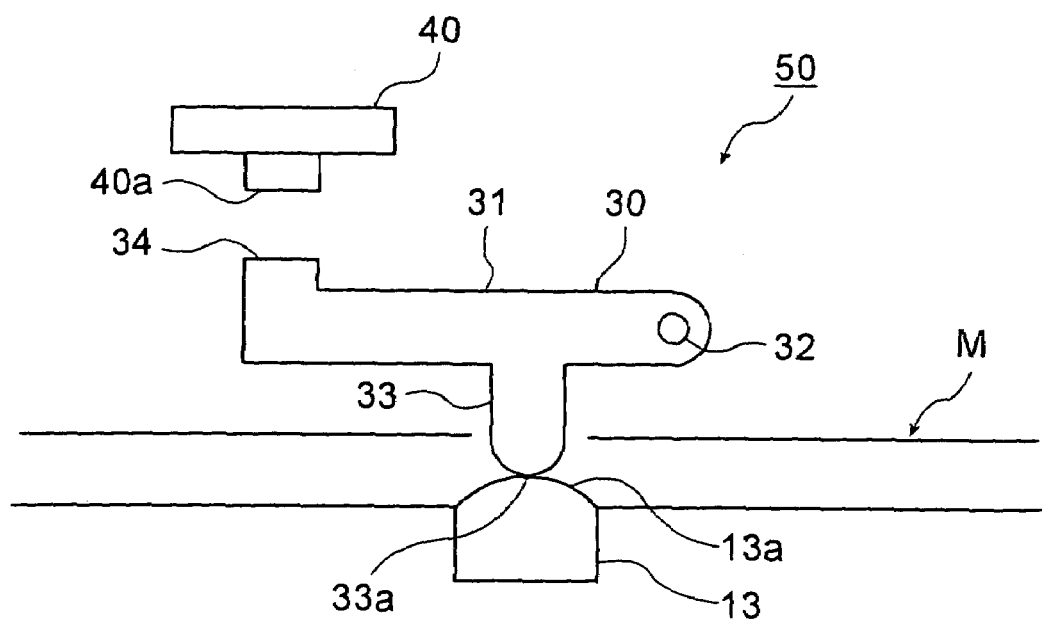
FIG. 7 shows a multifeed detection device according to a preferred embodiment of the invention.
Figure 8:
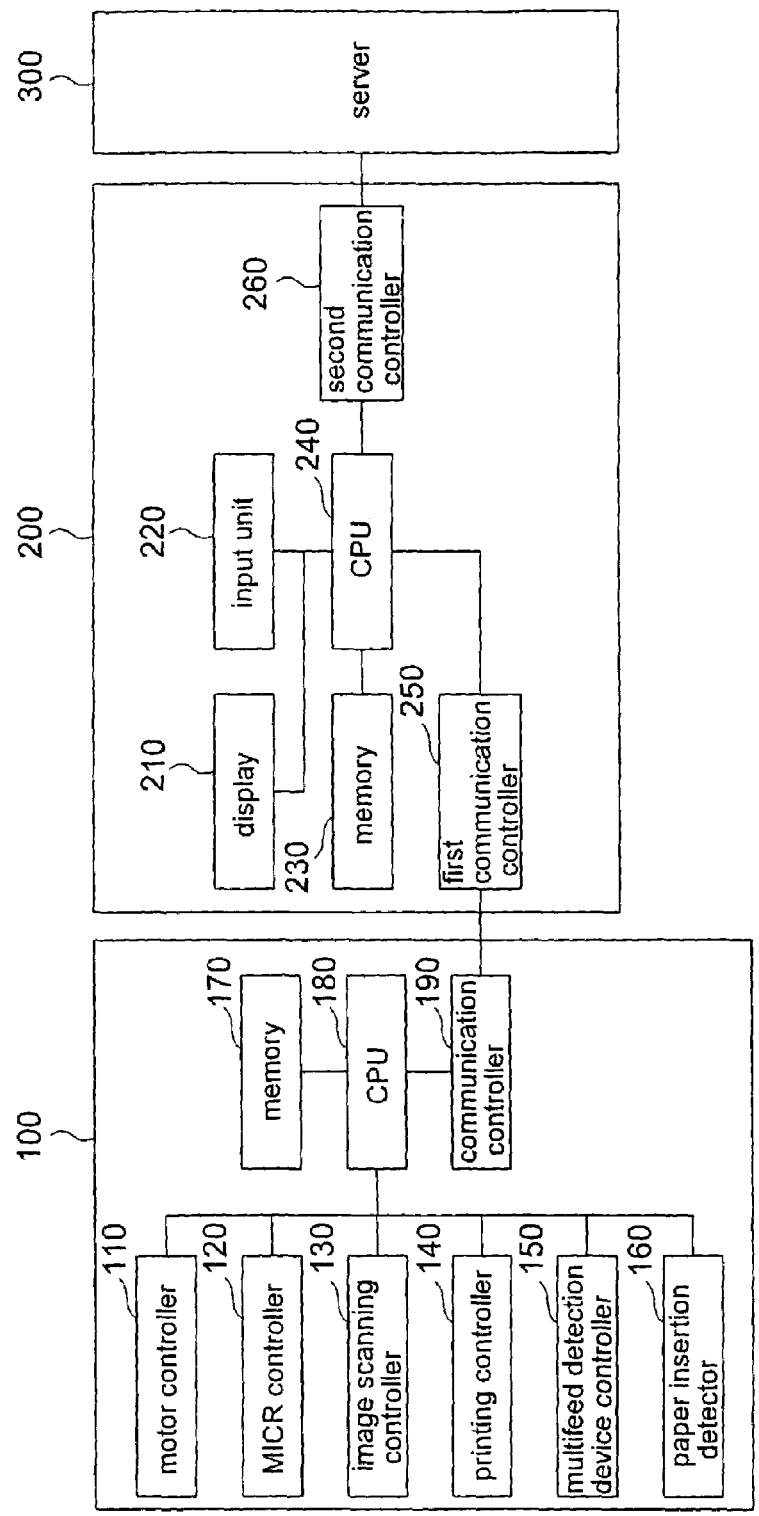
FIG. 8 is a control block diagram of the check processing system according to a preferred embodiment of the invention.
Figure 13:
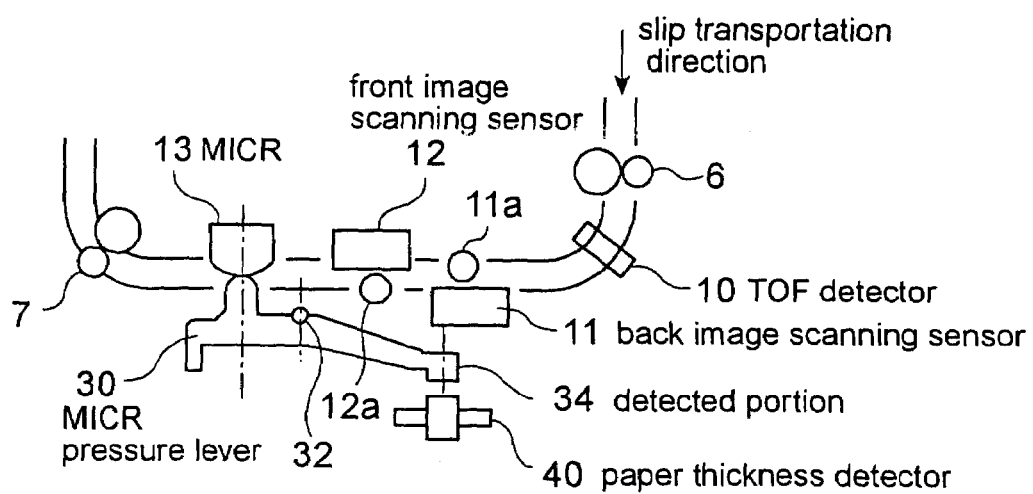
FIG. 13 is a detailed diagrammatic illustration of the multifeed detection device shown in FIG. 7.

As shown in FIG. 7 and FIG. 13, a multifeed detection device 50 including a pressure lever 30 and a displacement detection sensor 40 is disposed opposite the MICR 13. The pressure lever 30 presses checks S to the detection surface 13a of the MICR 13, and the displacement detection sensor 40 detects the displacement of the pressure lever 30 when the pressure lever 30 presses on a check S. When the transportation path is viewed as shown in FIG. 7, a check S travels from the left to the right side and exits in the direction of arrow B, and a check or other slip travels from the right to the left side in the figure when the transportation path is viewed as shown in FIG. 13.

More specifically, the pressure lever 30 is disposed with the lever body 31 thereof freely rotatable on a rotary shaft 32. A pressure portion 33 projects from the lever body 31 toward the detection surface of the MICR 13. The lever body 31 is urged toward the MICR 13 by a spring or other elastic member not shown, and the contact surface 33a of this pressure portion 33 is held by this urging force in contact with the detection surface 13a of the MICR 13.

When a check S is conveyed through the middle transportation path M, the check S passes between the MICR 13 and pressure portion 33, thus causing the pressure portion 33 and lever body 31 to pivot away from the MICR 13 according to the thickness of the check S. The displacement detection sensor 40 measures the thickness of the check S by measuring the distance between the detection surface 40a of the displacement detection sensor 40 and the detected portion 34 of the lever body 31. As a result of the displacement detection sensor 40 thus detecting the displacement of the pressure lever 30, whether two or more checks S are multifeeding can be determined by detecting if the displacement of the pressure lever 30 is greater than or equal to a specified amount.

Figure 9:
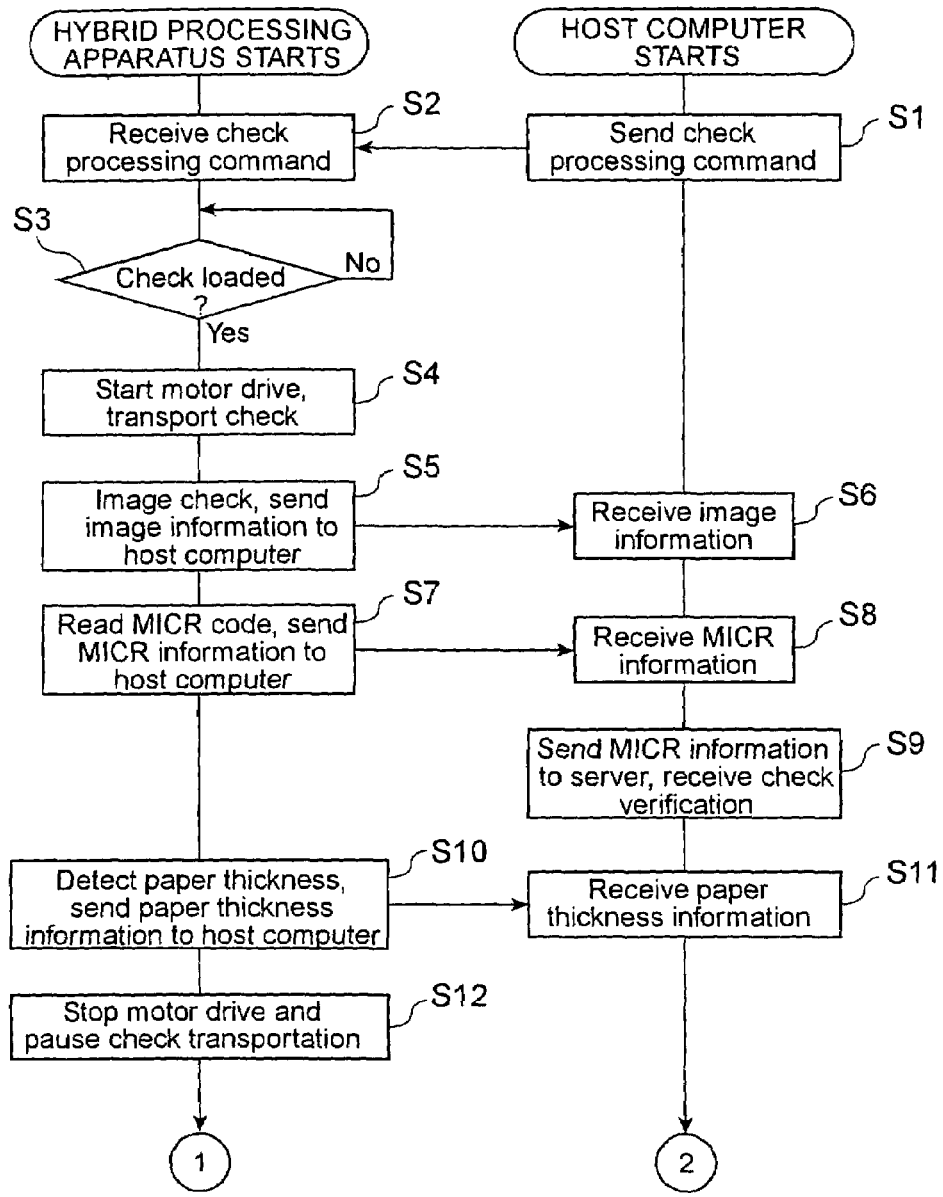
FIG. 9 is a flow chart of check processing in the check processing system of FIG. 8.
Figure 10:
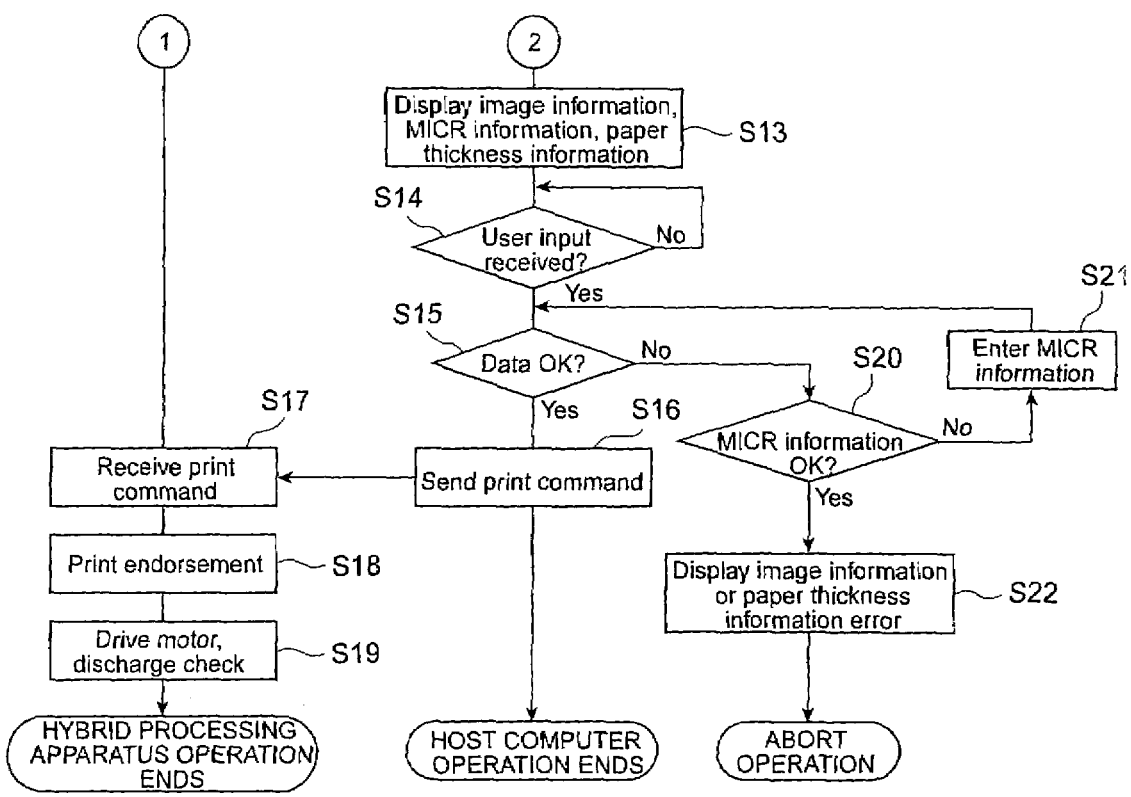
FIG. 10 is a continuation of the flow chart of FIG. 9.

The check System 1 according to this embodiment of the invention processes checks to detect multifeeding as shown in the flow charts of FIG. 9 and FIG. 10.

The check processing apparatus 100 and host computer 200 are connected to communicate with each other. The host computer 200 sends commands to the check processing apparatus 100 and also communicates with a server 300.

The control blocks of the check processing apparatus 100 are described first below.

The check processing apparatus 100 includes the following control units: a motor controller 110, an MICR controller 120, an image scanning controller 130, a printing controller 140, a multifeed detection device controller 150, a paper insertion detector 160, memory 170, CPU 180, and communication controller 190.

The motor controller 110 controls operation of the various drive rollers used in the check processing apparatus 100. More specifically, the motor controller 110 controls driving one or more motors not shown based on commands from the CPU 180, thus controls driving the drive rollers 6a, 7a, 8a, 17 disposed along the first transportation path P1 and second transportation path P2, and thereby controls conveying checks S and cards C.

The MICR controller 120 controls operation of the MICR 13. More specifically, the MICR controller 120 controls the timing at which the MICR controller 120 starts and stops reading based on commands from the CPU 180, thus controls reading the MICR code from each check S by the MICR 13, and acquires the magnetic ink character information.

The image scanning controller 130 controls operation of the first image scanning sensor 11 and second image scanning sensor 12. The image scanning controller 130 more specifically controls when the first image scanning sensor 11 and second image scanning sensor 12 start and stop scanning based on commands from the CPU 180, thereby images the front and back of a check S by means of the first image scanning sensor 11 and second image scanning sensor 12, and generates images of the front and back of the check S in memory 170. The image scanning controller 130 could send these front and back check images directly to the host computer 200 instead of storing the images to memory 170.

The printing controller 140 controls the print head 14 to print on a check S based on commands from the CPU 180. An example of printing by the print head 14 is printing an endorsement or transaction record on the back of the check S.

The multifeed detection device controller 150 controls the displacement detection sensor 40 of the multifeed detection device 50, determines the paper thickness according to detection signals output by the displacement detection sensor 40 according to the media thickness as described above, and thus produces paper thickness information from the detected paper thickness. Rather than thus generating paper thickness information, the multifeed detection device controller 150 could generate a binary signal denoting whether the paper thickness is greater than or equal to a specified threshold value, and this binary signal can be used as the paper thickness information.

The paper insertion detector 160 controls the BOF detector 9, TOF detector 10, BOC detector 25, and TOC detector 26, and detects the presence or absence of a check S or card C based on the detection signals from the BOF detector 9, TOF detector 10, BOC detector 25, and TOC detector 26.

The memory 170 is a data storage area for storing firmware executed by the CPU 180 and various settings. The MICR code, front and back check images, and paper thickness information acquired by the MICR controller 120, image scanning controller 130, and multifeed detection device controller 150 are also temporarily stored in memory 170. Commands sent from the host computer 200 are also buffered to memory 170.

The CPU 180 controls the other control units 110 to 160 by running firmware stored in memory 170. More specifically, the CPU 180 controls the other control units 110 to 160 according to commands received from the host computer 200 in order to convey or image a check S or card C, read MICR code, print to a check S, and detect multifeeding.

The communication controller 190 is a communication interface enabling the check processing apparatus 100 to communicate with the host computer 200. The communication controller 190 thus functions as a receiver for receiving commands sent from the host computer 200, and as a transmitter for sending the acquired MICR information, front and back check images, and paper thickness information to the host computer 200.

The host computer 200 is described next.

The host computer 200 has a display 210, input unit 220, memory 230, CPU 240, first communication controller 250, and second communication controller 260. The host computer 200 runs an application program stored in memory 230 to control the check processing apparatus 100, and to acquire the MICR information, front and back check images, and paper thickness information from the check processing apparatus 100.

The display 210 is used to present image information and text information. In a GUI (graphical user interface) environment, the display 210 also presents input screens for entering data, confirmation screens for user confirmation of acquired information, and other information according to the application program.

The input unit 220 is an input device such as a keyboard and mouse, for example. The user (operator) uses this input unit 220 to enter instructions and data to the host computer 200.

The first communication controller 250 and second communication controller 260 is a communication interface for communicating data with the check processing apparatus 100 and server 300. The host computer 200 sends commands to and receives such information as the MICR information, front and back check images, and paper thickness information from the check processing apparatus 100 through the first communication controller 250. The host computer 200 likewise sends requests to and receives information from the server 300 through the second communication controller 260.

The check processing method implemented by the check processing system 1 according to this embodiment of the invention is described next below with reference to the flow charts in FIG. 9 and FIG. 10.

This operation starts when the CPU 240 of the host computer 200 generates and sends a check processing command through the first communication controller 250 to the check processing apparatus 100 (step S1). This check processing command is a trigger causing the check processing apparatus 100 to read a check S.

The check processing apparatus 100 receives this check processing command through the communication controller 190, and buffers the received check processing command to memory 170 (step S2).

After this check processing command is received, the CPU 180 of the check processing apparatus 100 confirms by means of paper insertion detector 160 whether a check S is loaded in the paper supply section 3 (step S3). This step repeats until a check S is placed in the paper supply section 3.

When a check S is detected by the paper insertion detector 160, or more specifically is detected by the BOF detector 9, in step S3, the CPU 180 drives a motor not shown by way of the motor controller 110 so that the first transportation roller pair 6, middle transportation roller set 16, and second transportation roller pair 7 turn and transporting the check S starts (step S4).

When the check S is then conveyed by the first transportation roller pair 6, middle transportation roller set 16, and second transportation roller pair 7 to the first and second image scanning sensors 11 and 12, the CPU 180 acquires front and back images of the check S by driving the image scanning controller 130 so that the first and second image scanning sensors 11 and 12 image the front and back sides of the check S. The CPU 180 then sends the acquired front and back image information through the communication controller 190 to the host computer 200 (step S5).

The host computer 200 thus receives the front and back images through the first communication controller 250 and buffers the images to memory 230 (step S6).

When the check S is then conveyed to the MICR 13, the CPU 180 drives the MICR controller 120 so that the MICR 13 reads the magnetic ink characters printed on the check S, and thus acquires the MICR information. The CPU 180 then sends the acquired MICR information through the communication controller 190 to the host computer 200 (step S7).

The host computer 200 thus receives this MICR information through the first communication controller 250 and buffers the information to memory 230 (step S8).

In order to verify the account identified by the MICR code, the host computer 200 then sends the MICR information to the server 300 through the second communication controller 260. When the server 300 receives the MICR information, the server 300 confirms whether the account number for the account encoded in the MICR information exists and what the account balance is, and returns the verification result to the host computer 200. Based on this verification result, the host computer 200 then determines whether to continue processing the check S (step S9).

It is assumed below that this verification result indicates that the check S is valid and the host computer 200 therefore determines to continue processing the check S.

The CPU 180 of the check processing apparatus 100 then drives the MICR 13 to read the magnetic ink characters, simultaneously drives the multifeed detection device controller 150 to detect the check S thickness from the output of the multifeed detection device 50 disposed opposite the MICR 13, and thus acquires the paper thickness information. The CPU 180 then sends this paper thickness information through the communication controller 190 to the host computer 200 (step S10).

The host computer 200 thus receives the paper thickness information through the first communication controller 250 and buffers the paper thickness information to memory 230 (step S11).

The motor controller 110 of the check processing apparatus 100 then transports the check S to the printing position of the print head 14, and then stops driving the motor and stops paper transportation. The check S is thus caused to wait at the printing position of the print head 14 (step S12).

The CPU 240 of the host computer 200 then reads the front and back check images, MICR information, and paper thickness information from memory 230, and displays the images and information on the display 210 (step S13).

Figure 11:
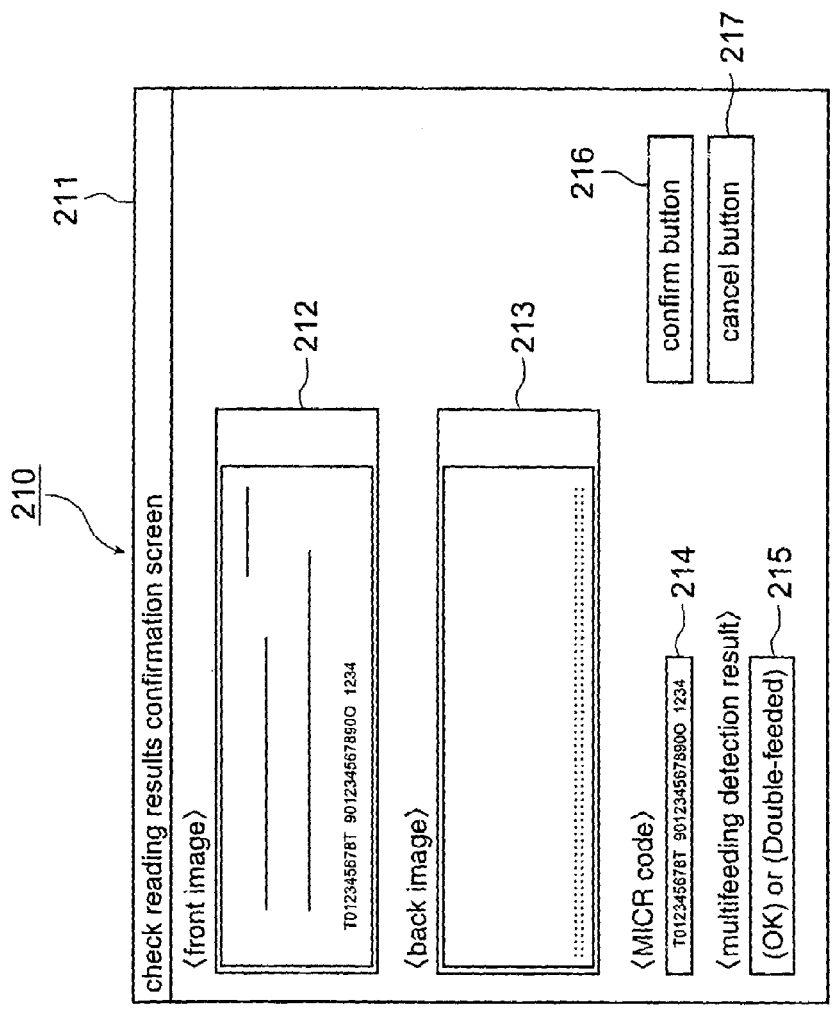
FIG. 11 shows a sample display screen presented on the display in the check-processing system according to a preferred embodiment of the invention.

A sample of the information presented on the display 210 at this time is shown in FIG. 11.

As shown in FIG. 11, the display screen 211 presented to the user on a display 210 in a GUI environment includes a front image display area 212 for displaying an image of the check front, a back image display area 213 for displaying an image of the check back, an MICR code display area 214 for presenting the MICR information, and a multifeeding detection result display area 215 for displaying the check multifeeding detection result calculated from the paper thickness information.

Because the MICR code printed on the check is displayed in the front image display area 212 based on the image information acquired from the check front, and the content of the MICR line calculated from the magnetically read MICR code is displayed in the MICR code display area 214 on the same screen, the operator can easily compare and confirm that the MICR information matches. More particularly, the operator can easily confirm if the MICR 13 correctly read the MICR code.

If the operator confirms from this display screen 211 that the information is correct, the operator clicks a confirm button 216, which is also shown in the display screen 211, to indicate that the check was scanned and read correctly. If the operator observes a problem with check processing, however, the operator clicks a cancel button 217, which is also shown in the display screen 211, to tell the host computer 200 that the check was not scanned and read correctly. A mouse or other input unit 220 is used to activate button 216 or 217, and operating either button sends the corresponding result to the host computer 200.

The host computer 200 waits until the operator either confirms the displayed information or cancels the operation, and executes step S15 when a response is received from either button 216 or 217 (step S14).

The host computer 200 then determines if the operator confirmed that the check processing results are good or if the operator observed a problem with check processing (step S15). If the user confirmed that the results are good, the CPU 240 sends an endorsement command for printing an endorsement (transaction record) on the back of the check S through the first communication controller 250 to the check processing apparatus 100 (step S16).

When the check processing apparatus 100 receives an endorsement command from the host computer 200, the check processing apparatus 100 first buffers the received endorsement command to memory 170 (step S17).

The CPU 180 of the check processing apparatus 100 then drives the printing controller 140 based on the endorsement command to print a transaction record on the back of the check S using the print head 14 (step S18). When endorsement printing ends, the motor controller 110 is driven again to convey the check S and discharge the check S from the paper exit 4 (step S19).

If there was no problem with check processing, such as check multifeeding, reading and processing the check S ends.

However, if the host computer 200 determined in step S15 that the operator detected a problem with check processing, the host computer 200 asks the operator via the display 210 whether the MICR information is correct (step S20).

If there is a problem with the MICR information, such as the MICR code was not read completely, the operator is prompted through a message on the display 210 to enter the correct MICR information using the input unit 220 (step S21). The screen presented on the display 210 prompting the user to enter the correct MICR code could also contain the front image of the check So that the operator can see the actual MICR code while entering the correct information. When the operator finishes entering the information, processing continues from step S15.

If the MICR code was read correctly (step S20 returns yes), there may have been a problem with the scanned images or the paper thickness information. An appropriate message is therefore presented on the display 210, and processing that check aborts (step S22). The message displayed at this time could, for example, tell the operator that there was a problem with scanning or paper thickness detection, that is, check multifeeding, and request that the operator return the check to the paper supply section.

Paper thickness errors, or more specifically multifeeding errors, are determined by the CPU 240 of the host computer 200 based on the detected paper thickness information as described above. The CPU 240 could therefore generate an error and abort check processing as soon a paper thickness error, that is, multifeeding, is detected.

Different scenarios in which the check processing system 1 of this embodiment detects multifeeding checks S based on the MICR information, front and back check images, and paper thickness information are described next below with reference to the check multifeeding arrangements shown in FIG. 12.

Figure 12:
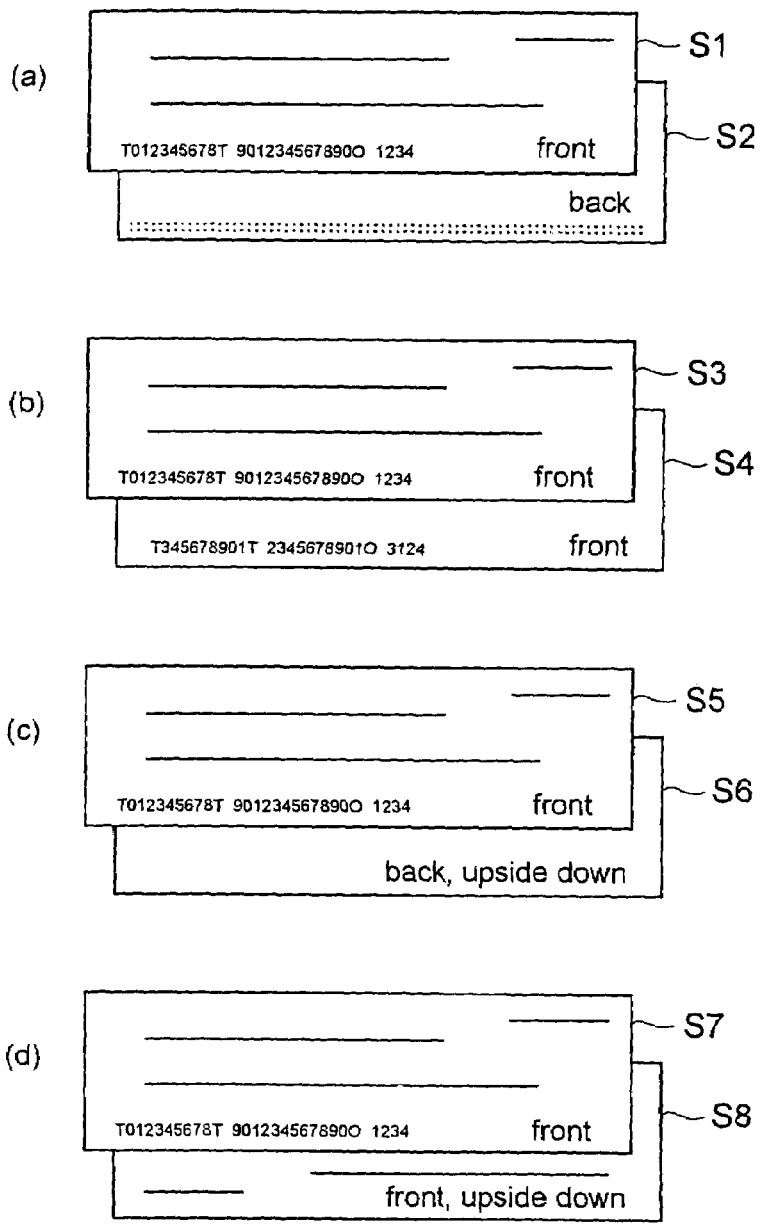
FIG. 12 shows typical patterns of how checks may be stacked during check multifeeding.

FIG. 12 shows several typical patterns in which multifeeding checks could be conveyed through the transportation path. In the arrangement shown in FIG. 12 (a), check S1 and check S2 are stacked back to back. When checks S1 and S2 are transported through the U-shaped first transportation path P1, the front of the top check (S1) is facing the inside of the transportation path, that is, the front of check S1 is facing the inside guide 2b. This also applies to the patterns shown in FIGS. 12(b), (c), and (d), that is, the front of check S3, S5, and S7 is facing the inside guide 2b side of the first transportation path P1.

When check S1 and check S2 are thus conveyed, the multifeed detection device 50 detects the paper thickness of the checks, and if the multifeed detection device 50 is functioning correctly, the detected paper thickness is the thickness of two checks.

In addition, the second image scanning sensor 12 images the front of check S1, and the first image scanning sensor 11 images the front of check S2.

If check S1 and check S2 are also positioned such that the MICR lines on the two checks are printed at substantially the same position, the MICR codes will overlap through the thickness of the checks. The MICR 13 cannot correctly read the MICR code in the portion where the magnetic ink codes overlap through the thickness of the checks, and the decoded MICR information will be inaccurate.

If checks are multifed as shown in FIG. 12(a), the paper thickness information will thus indicate the thickness of two checks. The host computer 200 can therefore determine that checks are probably multifeeding, output an error message, and interrupt check processing without waiting for the operator to confirm multifeeding.

Furthermore, even if the paper thickness is not correctly detected as the thickness of more than one check due to a multifeed detection device 50 malfunction or how the checks are conveyed, the front image of check S1 will be displayed in the front image display area 212 and the front image of check S2 will also be displayed in the back image display area 213 of a screen such as shown in FIG. 11. The operator can therefore determine at a glance that there is a problem with check reading.

In addition, because the MICR code is also not read correctly, the MICR information displayed in the MICR code display area 214 will be inaccurate or unintelligible, and the operator can again determine at a glance that there is a problem with check processing.

Check multifeeding can therefore normally be detected based on the paper thickness information when checks are multifed as shown in FIG. 12(a), but even if multifeeding is not detected because of inaccurate paper thickness information, the operator can readily see that there is a problem based on the front and back check images or the MICR results.

When checks are multifed as shown in FIG. 12(b), the front of check S4 touches the back of check S3.

When check S3 and check S4 are thus multifed, the multifeed detection device 50 detects the paper thickness of the checks, and if the multifeed detection device 50 is functioning correctly, the detected paper thickness is the thickness of two checks.

In addition, the second image scanning sensor 12 images the front of check S3, and the first image scanning sensor 11 images the back of check S4.

If check S3 and check S4 are also positioned such that the MICR lines on the two checks are printed at substantially the same position, the MICR codes will overlap through the thickness of the checks. The MICR 13 cannot correctly read the MICR code in the portion where the magnetic ink codes overlap through the thickness of the checks, and the decoded MICR information will be inaccurate.

Furthermore, even if the paper thickness is not correctly detected as the thickness of more than one check due to a multifeed detection device 50 malfunction or how the checks are conveyed when checks are transported as shown in FIG. 12(b), the front image of check S3 will be displayed in the front image display area 212 and the back image of check S4 will also be displayed in the back image display area 213 of a screen such as shown in FIG. 11. Because the operator could easily mistake the back image of check S4 as the back of check S3 in this case, detecting multifeeding based on the scanned check images is difficult.

However, because the MICR code is also not read correctly in this situation, the MICR information displayed in the MICR code display area 214 will be inaccurate or unintelligible, and the operator can again determine at a glance that there is a problem with check processing.

Check multifeeding can therefore normally be detected based on the paper thickness information when checks are multifed as shown in FIG. 12(b), but even if multifeeding is not detected because of inaccurate paper thickness information, the operator can readily see that there is a problem based on the MICR results.

When checks are multifed as shown in FIG. 12(c), the back of check S6 faces the back of check S5, but check S6 is upside down relative to check S5.

When check S5 and check S6 are thus multifed, the multifeed detection device 50 detects the paper thickness of the checks, and if the multifeed detection device 50 is functioning correctly, the detected paper thickness is the thickness of two checks.

In addition, the second image scanning sensor 12 images the front of check S5, and the first image scanning sensor 11 images the front of check S6 with the image upside down relative to check S5.

However, even if the MICR line is printed at the same position on check S5 and check S6, the MICR lines will not overlap through the thickness of the checks in the arrangement shown in FIG. 12(*c*) because check S6 is upside down relative to check S5. The MICR 13 can therefore accurately read the MICR code printed on check S5.

Furthermore, even if the paper thickness is not correctly detected as the thickness of more than one check due to a multifeed detection device 50 malfunction or how the checks are conveyed when checks are transported as shown in FIG. 12(*c*), the front image of check S5 will be displayed in the front image display area 212 and the front image of check S6 will also be displayed upside down in the back image display area 213 of a screen such as shown in FIG. 11. The operator can therefore determine at a glance that there is a problem with check reading.

However, because the MICR code is correctly read and the MICR information shown in the MICR code display area 214 matches the magnetic ink characters displayed in the front image of the check, the operator cannot detect check multifeeding based on the displayed MICR information.

Check multifeeding can therefore normally be detected based on the paper thickness information when checks are multifed as shown in FIG. 12(*c*), but even if multifeeding is not detected because of inaccurate paper thickness information, the operator can readily see that there is a problem based on the front and back check images.

When checks are multifed as shown in FIG. 12(*d*), the front of check S8 touches the back of check S7, but check S8 is upside down relative to check S7.

When check S7 and check S8 are thus multifed, the multifeed detection device 50 detects the paper thickness of the checks, and if the multifeed detection device 50 is functioning correctly, the detected paper thickness is the thickness of two checks.

In addition, the second image scanning sensor 12 images the front of check S7, and the first image scanning sensor 11 images the back of check S8 upside down relative to check S7.

However, even if the MICR line is printed at the same position on check S7 and check S8, the MICR lines will not overlap through the thickness of the checks in the arrangement shown in FIG. 12(*d*) because check S8 is upside down relative to check S7. The MICR 13 can therefore accurately read the MICR code printed on check S7.

Furthermore, even if the paper thickness is not correctly detected as the thickness of more than one check due to a multifeed detection device 50 malfunction or how the checks are conveyed when checks are transported as shown in FIG. 12(*d*), the front image of check S7 will be displayed in the front image display area 212 and the back image of check S8 will be displayed upside down in the back image display area 213 of a screen such as shown in FIG. 11. If the top and bottom of check S8 can be determined from the image of the back of check S8, the operator might be able to detect a multifeeding problem by comparing the front and back images. However, detecting the top and bottom is generally not easy by looking at the back of a check, and it is therefore difficult for the operator to reliably determine from the check images that there is a check reading error.

In addition, because the MICR code is correctly read and the MICR information shown in the MICR code display area 214 matches the magnetic ink characters displayed in the front image of the check, the operator cannot detect check multifeeding based on the displayed MICR information.

Multifeed detection when checks are conveyed as shown in FIG. 12 (*d*) is therefore possible by sensing check multifeeding based on the paper thickness information. Unlike the situations shown in FIG. 12(*a*) to (*c*), multifeed detection in the case shown in FIG. 12(*d*) relies solely on the paper thickness information, that is, the detection result of the multifeed detection device 50. However, the situation shown in FIG. 12(*d*) accounts for only about ¼ of all multifeed occurrences, and multifeed detection is double-checked by two or more detectors in the other ¾ of all multifeed occurrences. The likelihood of multifeed detection errors can therefore be reduced overall.

Moreover, because it is thus known that multifeeding is not double-checked when the checks are arranged as shown in FIG. 12(*d*), this situation can be specifically avoided by purposely loading the checks into the paper supply section 3 so that the front of check S8 cannot be fed both facing the back of check S7 and upside down relative to check S7 as shown in FIG. 12(*d*). As a result, two or more detectors are always used to check for multifeeding.

Furthermore, a mechanism for preventing feeding checks upside down similarly to check S8 could also be provided to afford even more reliable multifeed detection. For example, a magnetic sensor could be disposed at a position where the sensor can detect magnetism from the magnetic ink characters on a check S when the check S is, upside down similarly to check S8. When this magnetic sensor detects magnetism, the check is known to at least be upside down, and an error can be generated to interrupt processing.

As described above, a check processing system 1 according to this embodiment of the invention has a check processing apparatus 100 and a host computer 200 connected so as to communicate with the check processing apparatus 100.

The check processing apparatus 100 has a paper supply section 3 for feeding checks S one at a time to a first transportation path P1, image scanning sensors 11 and 12 as an image scanning sensor for acquiring check information relating to each check S and disposed to the first transportation path P1 for imaging both sides of each check S, a MICR 13 disposed to the first transportation path P1 for reading MICR information from magnetic ink characters printed on the check S, and a multifeed detection device 50 for detecting thickness information for checks S conveyed through the first transportation path P1. This check processing apparatus 100 also has a communication controller 190 as a transmission unit for sending check information to the host computer 200 and a reception unit for receiving print commands from the host computer 200 after sending the check information, and a print head 14 for printing on a check S according to the received print commands.

The host computer 200 has a first communication controller 250 as a transmission unit for sending check information acquisition commands to the check processing apparatus 100 and as a reception unit for receiving the check information from the check processing apparatus 100, and a CPU 240 for confirming the presence or absence of check multifeeding in the check processing apparatus 100 based on the check information and controlling printing to the check S by the check processing apparatus 100 based on the result of multifeeding detection.

A host computer 200 according to this embodiment of the invention prevents the check processing apparatus 100 from printing until the host computer 200 confirms whether or not checks are multifeeding. More specifically, the host computer 200 commands the check processing apparatus 100 to print to a check S only after the host computer 200 determines that checks are not multifeeding, and because the check processing apparatus 100 prints a transaction record on the back of the check, problems such as processing one check and printing the transaction record on another check because the checks are multifeeding are prevented. A check processing system 1 according to this embodiment of the invention can therefore prevent reading errors during check processing, and thus affords smooth, efficient check processing at a bank teller window, for example.

Furthermore, the CPU 240 in this embodiment of the invention checks for multifeeding based on paper thickness information, based on check image information, and based on MICR information, and outputs a print command only when check multifeeding is not detected. By thus checking three times for multifeeding based on paper thickness information, image information, and MICR information, this embodiment of the invention affords higher reliability multifeed detection when compared with detecting multifeeding using only the paper thickness information, for example, and read errors during check processing can therefore be further reduced.

The host computer 200 also has a display 210 for displaying the paper thickness information, image information, and MICR information received from the check processing apparatus 100, and an input unit 220 for entering whether or not the paper thickness information, image information, and MICR information shown on the display 210 is correct. The operator (user) can therefore check for multifeeding based on the content shown on the display 210, and even if checks are multifeeding, can indicate using the input unit 220 whether the paper thickness information, image information, or MICR information is correct. The operator can thus individually confirm for each check whether the check was processed and discharged even though the check S was read inaccurately.

More specifically, the image information includes both front and back images of the check, and the CPU 240 can detect multifeeding by comparing the front and back check images. The CPU 240 can also detect multifeeding by confirming whether the MICR information was read correctly. Yet further, the CPU 240 can also detect multifeeding based on the paper thickness information.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A host computer for controlling a check processing apparatus including a paper supply unit for feeding checks individually to a paper transportation path; an image scanning sensor disposed to the paper transportation path for acquiring check image information as check information; an MICR disposed to the paper transportation path for acquiring magnetic ink character information from magnetic ink characters printed on the check as check information; and a multifeed detection device for detecting thickness information from the check(s) as conveyed on the paper transportation path past said MICR, said host computer comprising:
   a transmission unit for sending an acquisition command to the check processing apparatus to acquire said check information in order to perform an analysis of said check information for the existence of multifeeding;
   a receiving unit for receiving the check information from the check processing apparatus; and
   a control unit comprising a CPU for analyzing the check information received from the receiving unit including the thickness information received from the multifeed detection device; the image information received from the image scanning sensor, and the magnetic ink character information acquired from magnetic ink characters printed on the check
   wherein an error message is generated when multifeeding is detected,
   further comprising:
   a display device for displaying the thickness information, the image information, and the magnetic ink character information received from the check processing apparatus; and
   an input device to enable a determination of whether the thickness information and either the image information or the magnetic ink character information as displayed on the display device is correct or not.

2. The host computer as described in claim 1, wherein the image information includes check front image information and check back image information; and
   wherein the CPU in said control unit compares the check front image information with said check back image information to detect the presence of multifeeding.

3. The host computer as described in claim 1, wherein the CPU in said control unit for confirming if the magnetic ink character information is accurate.

4. A system for processing checks comprising a check processing apparatus and a host computer connected to communicate with the check processing apparatus, wherein:
   (a) the check processing apparatus comprises
     a paper supply unit for feeding checks individually to a paper transportation path;
     an information reading sensor for acquiring check information from the check(s) disposed to said paper transportation path;
     a transmission unit for sending the check information acquired from the information reading sensor to the host computer;
   (b) the host computer comprises
     a transmission unit for sending a check information acquisition command to the check processing apparatus;
     a reception unit for receiving the check information from the check processing apparatus; and
     a control unit for confirming the presence or absence of check multifeeding in the check processing apparatus based on the check information acquired from the information reading sensor with the control unit generating an error message when multifeeding is detected;
   wherein the information reading sensor comprises
     an image scanning sensor disposed to the paper transportation path for acquiring check image information as the check information;
     an MICR disposed to the paper transportation path for acquiring magnetic ink character information from magnetic ink characters printed on the check as the check information; and
     a multifeed detection device for detecting thickness information from the check(s) conveyed on the paper transportation path, past said MICR,
   wherein:
   the host computer further comprises:

a display device for displaying the thickness information, the image information, and the magnetic ink character information received from the check processing apparatus; and an input device to enable a determination of whether the thickness information and either the image information or the magnetic ink character information as displayed on the display device is correct or not.

5. A method for processing checks in a check processing system including a check processing apparatus having an information reading sensor and a host computer connected to communicate with the check processing apparatus, comprising the steps of:

feeding checks individually along a paper transportation path;

using said information reading sensor to acquire check information from the check(s) disposed to said paper transportation path with said check information including image information for the check, magnetic ink character information acquired from magnetic ink characters printed on the check, and thickness information for the check;

sending the check information to the host computer;

displaying the image information, the magnetic ink character information, and the thickness information as received from the check processing apparatus;

receiving confirmation of the thickness information and either the image information or the magnetic ink character information displayed on the display device; and determining if more than one check is being multifed to said information reading sensor.

* * * * *